United States Patent
Webber

(10) Patent No.: US 6,730,136 B2
(45) Date of Patent: May 4, 2004

(54) DIRECT ADDITION OF BETA-AMINOENONES IN ORGANIC ELECTROLYTES OF NONAQUEOUS CELLS EMPLOYING SOLID CATHODES

(75) Inventor: Andrew Webber, Avon Lake, OH (US)

(73) Assignee: Eveready Battery Company, Inc., St. Louis, MO (US)

(*) Notice: Subject to any disclaimer, the term of this patent is extended or adjusted under 35 U.S.C. 154(b) by 243 days.

(21) Appl. No.: 09/968,112

(22) Filed: Oct. 1, 2001

(65) Prior Publication Data

US 2003/0070283 A1 Apr. 17, 2003

(51) Int. Cl.$^7$ .................. H01M 6/00; H01M 6/04
(52) U.S. Cl. .................... 29/623.1; 429/347
(58) Field of Search .................. 29/623.1; 429/347, 429/188, 218.1, 331

(56) References Cited

U.S. PATENT DOCUMENTS

| | | | |
|---|---|---|---|
| 4,489,144 A | 12/1984 | Clark | 429/196 |
| 4,952,330 A | 8/1990 | Leger et al. | 252/62.2 |
| 5,219,683 A | 6/1993 | Webber | 429/197 |
| 5,229,227 A | 7/1993 | Webber | 429/197 |
| 5,290,414 A | 3/1994 | Marple | 204/252 |
| 5,432,030 A | 7/1995 | Vourlis | 429/197 |
| 5,514,491 A | 5/1996 | Webber | 429/194 |
| 5,582,934 A | * 12/1996 | Steinbrecher | 429/204 |
| 5,691,083 A | 11/1997 | Bolster | 429/194 |
| 6,255,021 B1 | 7/2001 | Kusumoto et al. | |

FOREIGN PATENT DOCUMENTS

| | | | |
|---|---|---|---|
| EP | 1120848 | 1/2001 | |
| JP | 2-244566 | * 9/1990 | H01M/10/40 |
| JP | 8-225502 | * 8/1996 | C07C/225/16 |
| JP | 8-236155 | * 9/1996 | H01M/10/40 |
| JP | 10189008 | 7/1998 | |
| WO | WO 01/45193 | 6/2001 | |

OTHER PUBLICATIONS

Micetich, R. G., "Lithiation of five–membered heteroaromatic compounds. The methyl substituted 1,2–azoles, oxadiazoles, and thiadiazoles," *Canadian Journal of Chemistry*, vol. 48, pp. 2006–2015, (1970).

Kashima, C., "A New Conversion of 3,5–Disubstituted Isoxazoles to a,β–Unsaturated Ketones," *J. Org. Chem.*, vol. 40, No. 4, pp. 526–527, (1975).

Buchi, et al., "Interchange of Functionality in Conjugated Carbonyl Compounds through Isoxazoles," *Journal of the Amer. Chem. Soc.*, 94:26, pp. 9128–9132, (1972).

Ohashi, et al., "The Lability of Nitrogen–Oxygen Linkage of Isoxazoles Upon Electron Impact," *Tetrahedron Letters No. 3*, pp. 379–383, (1968).

Khurana, et al., "Reduction of Some Alkylisoxazoles with Lithium Aluminum Hydride," Dept. of Chemistry, Simon Fraser Univ., Burnaby, British Columbia V5A 156, pp. 3011–3013.

Sato, et al. "The Photochemical Reaction of 3,5–Disubstituted Isoxazoles," *Chemistry Letters*, Chemical Society of Japan, pp. 111–114, (1973).

Natale, N., "Selective Reduction of Isoxazoles with Samarium Diiodide," *Tetrahedron Letters*, vol. 23, No. 48, pp. 5009–5012, (1982).

Lunn, G., "Reduction of Heterocycles with Nickel–Aluminum Alloy," *J. Org. Chem.*, vol. 52, pp. 1043–1046 (1987).

Nitta, et al., "Reductive Ring Opening of Isoxazoles with Mo(CO)6 and Water," *J.Chem.Soc.*, pp. 877–878., (1982).

Kashima, et al., "The Reaction of 3,5–Dimethylisoxazole with Some Electrophiles," *Heterocycles*, Vol 6, No. 6, pp. 805–828, (1977).

Sato, et al., "Reductive Ring Cleavage of 3,5–Dimethylisoxazole by Irradiation in the Presence of Triethylamine," *J.C.S. Chem. Comm.*, pp. 781–782, (1974).

Kotera, et al., "Transformation of Isoxazolines into Aziridines by Lithium Aluminum Hydride Reduction," *Tetrahedron Letters* No. 55, pp. 5759–5762, (1968).

Kotera, et al., "Conversion of 2–Isoxazolines into Aziridines by Lithium Aluminum Hydride Reduction," *Tetrahedron.* vol. 26, pp. 539–556, (1970).

* cited by examiner

*Primary Examiner*—Patrick Ryan
*Assistant Examiner*—Julian Mercado
(74) *Attorney, Agent, or Firm*—Russell H. Toye, Jr.

(57) ABSTRACT

A method for manufacturing a nonaqueous cell employing an anode, a cathode and an organic electrolyte wherein the cathode comprises an active cathode material, and the organic electrolyte contains a beta-aminoenone in a range of 0.1 to 5.0 volume percent based on the volume of the electrolyte solvent so as to aid in reducing the undesirably high initial open circuit voltage normally observed with the use of cathodes such as $FeS_2$.

13 Claims, No Drawings

DIRECT ADDITION OF BETA-AMINOENONES IN ORGANIC ELECTROLYTES OF NONAQUEOUS CELLS EMPLOYING SOLID CATHODES

TECHNICAL FIELD

The invention relates to a method for manufacturing a nonaqueous cell employing an anode, a cathode comprising an active cathode material and an organic electrolyte. The method involves the direct addition of a beta-aminoenone, such as 4-amino-3-penten-2-one, to the electrolyte to aid in reducing any undesirably high initial open circuit voltage such as that normally observed with cathodes such as $FeS_2$.

BACKGROUND ART

The development of high energy cell systems requires the compatibility of an electrolyte possessing desirable electrochemical properties with highly active anode materials, such as lithium, calcium, sodium and the like, and the efficient use of high energy density cathode materials. Such suitable high energy density cathode materials includes iron sulfides such as $FeS_2$ and FeS, carbon flourides such as $CF_x$, metal oxides such as $V_2O_5$, $WO_3$, $MoO_3$, lead oxides such as $Pb_3O_4$, $PbO_2$ and PbO, cobalt oxides such as $Co_3O_4$, manganese oxides such as $MnO_2$, $In_2S_3$, NiS, metal chromates such as $Ag_2CrO_4$, metal phosphates such as $Ag_3PO_4$, $LiCoO_2$, $LiMn_2O_4$, $Bi_2O_3$, CuO and $Cu_2O$ and metal sulfates such as $CuSO_4$. The use of aqueous electrolytes is precluded in these systems since the anode materials are sufficiently active to react with water chemically. Therefore, in order to realize the high energy density obtainable through use of these highly reactive anodes and high energy density cathodes, it is necessary to use a nonaqueous electrolyte system.

Many cell or battery applications, particularly in transistorized devices, such as hearing aids, watches, calculators, and the like, require a substantially unipotential discharge source for proper operation. However, it has been found that in many nonaqueous cells employing positive active materials, which include conductive additives such as graphite and/or carbon, the cell upon initially being discharged, exhibits a high voltage whereupon the cell then proceeds to reach its lower operating discharge voltage level only after a certain time period has elapsed. The time period for the cell to reach its intended operating discharge voltage level usually depends on the discharge rate through the load and thus, depending on the apparatus it is to power, could result in a period extending up to several hours or even days. This phenomenon has serious drawbacks when a cell is intended to be used in electronic devices requiring a substantially unipotential discharge source for proper operation. In some of these electronic devices, any initial voltage peak substantially exceeding the intended operating voltage for the device could result in serious damage to the electronic components of the device.

One approach to protect devices from batteries exhibiting high voltages prior to leveling off to their desired operating voltage level is to add additional electronic circuit components to protect the main operating components of the device. However, this not only adds to the expense of the device but also would result in enlarging the device to accommodate the protective circuitry. Larger devices run counter to the current emphasis placed on miniaturization, where it has become necessary for the battery industry to design smaller and smaller electrochemically powered cells.

Another approach designed to reduce an initially high and potentially disadvantageous voltage is to subject such cells to a pre-discharge regimen prior to initial use by an end user. But such pre-discharge regimens are time consuming and costly, and reduce the capacity of the cell. Therefore, it is desirable to reduce or eliminate any required pre-discharge.

It has been suggested in U.S. Pat. No. 4,489,144 that the addition of an isoxazole derivative, such as 3,5-dimethylisoxazole, to the electrolyte may compensate for or eliminate this initial high voltage during discharge of nonaqueous cells. It was believed that the isoxazole derivative reacted with unwanted species that presumably caused the initial high voltage by reducing these species. The entire disclosure of U.S. Pat. No. 4,489,144 is hereby incorporated by reference as if fully rewritten herein.

It has now been determined that a favorable reduction in initial open circuit voltage in a nonaqueous cell can be achieved by the addition of a beta-aminoenone to the electrolyte. Accordingly, it is an object of the within invention to provide a method for manufacturing a cell comprising a highly active anode such as lithium, a cathode comprising an active material such as $FeS_2$, and a nonaqueous electrolyte comprising a beta-aminoenone such as 4-amino-3-penten-2-one.

DETAILED DESCRIPTION OF THE INVENTION

The invention basically relates to a method of manufacturing a nonaqueous cell comprising the steps of providing an anode, an organic electrolyte, and a solid cathode. The method includes the step of adding a beta-aminoenone in a range of 0.1 to 5.0 volume percent to the electrolyte based on the volume of the electrolyte solvent.

The addition of a beta-aminoenone, such as 4-amino-3-penten-2-one, to nonaqueous organic electrolytes is effective in reducing and stabilizing the undesirably high initial open circuit voltages observed with cathode materials such as $FeS_2$. As used herein, the term "beta-aminoenone" will be used to describe a material containing any of the following structures:

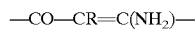

where R is hydrogen or an alkyl group; or

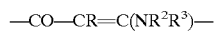

where R, $R^2$ and $R^3$ are hydrogen or an alkyl group; or

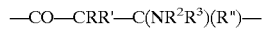

where R, R', R", $R^2$ and $R^3$ are hydrogen or an alkyl group.

The beta-aminoenone additive is employed in the concentration range of between 0.1 and 5.0 volume percent based on the volume of the electrolyte solvent, preferably between 0.2 and 4.0 volume percent, and still more preferably between 0.2 and 2.0 volume percent, for most nonaqueous electrochemical couples.

The effectiveness of beta-aminoenones in controlling initially high open circuit voltage was first discovered while examining the electrolyte solution of nonaqueous cells employing carbon and/or graphite-containing $FeS_2$ cathodes and lithium anodes. These cells were manufactured with an electrolyte solvent that included 3,5-dimethylisoxazole (DMI), an isoxazole derivative, as described in U.S. Pat. No. 4,489,144. Upon aging, gas chromatography (GC) studies on the electrolyte from the undischarged cells revealed that the DMI was no longer detectable. Instead, an amine was detected which was not initially present in the electrolyte. The amine was identified as 4-amino-3-penten-2-one (AP), one member of a class of beta-aminoenones. A second compound was also detected which was not initially present in the electrolyte: 2,4-pentanedione (PD). It is believed that the presence of PD is at least in part an artifact produced by exposure of the electrolyte to water during the GC sample preparation.

The reaction mechanism involving DMI and AP was further investigated by GC analysis of electrolytes from vial storage studies. In these studies, various components of a Li/FeS$_2$ cell were isolated and combined with electrolyte containing DMI. The procedure in general was as follows: A ¾ inch square piece of cell component sample was placed in a 1 ounce jar. An electrolyte was prepared containing 1 mole of LiCF$_3$SO$_3$ added to 1 liter of 25:75:0.2 DIOX:DME:DMI by volume, where DIOX is 1,3-dioxolane and DME is 1,2-dimethoxyethane. One hundred micro liters of electrolyte was added to a vial. The vial was then capped and stored in the dry box for three hours. At the end of this period, the electrolyte was recovered in methylene chloride, the solution was extracted with water and the methylene chloride layer was analyzed.

Initially, electrolyte reaction with the lithium, separator material and cathode stock was examined. The results are presented in Table 1.

TABLE 1

| | PERCENT OR PPM BY GC PEAK AREA | | | |
|---|---|---|---|---|
| REACTANTS | % DIOX | % DME | % DMI | ppm AP |
| Electrolyte + lithium foil | 23.42 | 76.14 | .44 | ND* |
| Electrolyte + separator | 23.66 | 75.91 | .44 | ND* |
| Electrolyte + cathode stock | 21.97 | 77.87 | .09 | 614 |
| Electrolyte | 25.48 | 74.14 | .38 | ND* |

*None detected.

The above data indicate that DMI is degraded in a reaction involving the cathode. To further isolate the point of DMI degradation, cathode mix was isolated from the aluminum foil substrate and the vial test was run on the cathode mix and this aluminum separately. The mix and the aluminum substrate were recombined and another vial test was run. A further vial test was run on cathode mix and fresh aluminum. The results are presented in Table 2.

TABLE 2

| | PERCENT OR PPM BY GC PEAK AREA | | | | |
|---|---|---|---|---|---|
| REACTANTS | % DIOX | % DME | % DMI | ppm AP | ppm PD |
| Electrolyte + cathode mix | 23.88 | 75.52 | .44 | ND* | ND* |
| Electrolyte + alum. substrate | 24.04 | 75.46 | .43 | ND* | ND* |
| Electrolyte + cathode mix + alum. substrate | 23.61 | 76.06 | .25 | 362 | 534 |
| Electrolyte + cathode mix + fresh aluminum | 24.18 | 75.45 | .31 | 47 | 477 |

*None detected.

In a further attempt to isolate the reactive species in the degradation of DMI and the generation of AP, cathode mix components were individually subjected to the vial test in combination with fresh substrate aluminum. These results are presented in Table 3.

TABLE 3

| | PERCENT OR PPM BY GC PEAK AREA | | | | |
|---|---|---|---|---|---|
| REACTANTS | % DIOX | % DME | % DMI | ppm AP | ppm PD |
| Electrolyte + FeS2 (undried) | 20.27 | 78.90 | .42 | ND* | ND* |
| Electrolyte + Acetylene black | 25.24 | 74.38 | .38 | ND* | ND* |
| Electrolyte + polyethylene/polypropylene copolymer | 25.32 | 74.27 | .41 | ND* | ND* |
| Electrolyte + polyethylene oxide | 25.13 | 74.47 | .38 | ND* | ND* |

*None detected.

The above data indicates that the DMI degradation reaction to produce AP only takes place in the presence of both the cathode mix and an aluminum substrate current carrier, and suggests that the degradation reaction involves a possible interaction of the cathode mix with the aluminum cathode current carrier.

Further experiments were carried out to determine whether the direct addition of AP or PD into the electrolyte solvent in place of DMI would show similar advantageous results in reducing the open circuit voltage of an undischarged cell. Several lots of nonaqueous AA size lithium anode iron pyrite cathode cells were constructed using the electrolyte described above with the following variations: a) no DMI, b) 0.2% DMI, c) 0.2% PD (instead of DMI) and d) 0.2% AP (instead of DMI), all by volume percent of the electrolyte solvent. The pyrite for these cells came from different production batches as indicated in the attached tables but was essentially the same material. The cells were stored either at ambient temperature (21° C.) or at 60° C. The cells were removed from storage at the indicated period in the tables below and the open circuit voltage for the cell was measured. The cells were then autopsied and GC analysis was performed on the electrolyte. The results for the ambient cells are presented in Table 4 and for the 60° C. cells in Table 5. Significantly, none of these cells contained any detectable amounts of DMI even after only two weeks at ambient temperature, indicating that the degradation reaction is completed relatively quickly, even at ambient storage temperatures.

TABLE 4

| | STORAGE AT 21° C. | | | |
|---|---|---|---|---|
| Electrolyte description/ storage duration | Pyrite lot # | OCV prior to autopsy (Volts) | ppm AP (by GC peak area) | ppm PD (by GC peak area) |
| No DMI | 171 | | | |
| 2 weeks | | 1.727 | ND* | ND* |
| 7 weeks | | 1.757 | ND* | ND* |
| 23 weeks | | 1.785 | ND* | ND* |
| No DMI | 172 | | | |
| 2 weeks | | 1.732 | ND* | ND* |
| 10 weeks | | 1.760 | ND* | ND* |
| 16 weeks | | 1.775 | ND* | ND* |
| 0.2% DMI | 171 | | | |
| 2 weeks | | 1.725 | 1441 | ND* |
| 7 weeks | | 1.748 | 334 | ND* |
| 23 weeks | | 1.748 | ND* | ND* |
| 0.2% DMI | 172 | | | |
| 2 weeks | | 1.726 | 1080 | ND* |

TABLE 4-continued

STORAGE AT 21° C.

| Electrolyte description/ storage duration | Pyrite lot # | OCV prior to autopsy (Volts) | ppm AP (by GC peak area) | ppm PD (by GC peak area) |
|---|---|---|---|---|
| 10 weeks | | 1.730 | 51 | ND* |
| 16 weeks | | 1.745 | 32 | ND* |
| 0.2% PD | 171 | | | |
| 2 weeks | | 1.725 | ND* | 39 |
| 7 weeks | | 1.758 | ND* | ND* |
| 23 weeks | | 1.780 | ND* | ND* |
| 0.2% AP (supplied by Lancaster Synthesis) | 172 | | | |
| 2 weeks | | 1.727 | 1379 | ND* |
| 10 weeks | | 1.730 | ND* | ND* |
| 16 weeks | | 1.740 | 304 | ND* |
| 0.2% AP (supplied by TCI) | 172 | | | |
| 2 weeks | | 1.727 | 2215 | ND* |
| 10 weeks | | 1.740 | 192 | ND* |
| 16 weeks | | 1.740 | ND* | ND* |

*None detected.

TABLE 5

STORAGE AT 60° C.

| Electrolyte description/ storage duration | Pyrite lot # | OCV PRIOR TO AUTOPSY (Volts) | ppm AP (by GC peak area) | ppm PD (by GC peak area) |
|---|---|---|---|---|
| No DMI | 171 | | | |
| 4 weeks | | 1.846 | ND* | ND* |
| 12 weeks | | 1.847 | ND* | ND* |
| No DMI | 172 | | | |
| 4 weeks | | 1.830 | ND* | ND* |
| 12 weeks | | 1.830 | ND* | ND* |
| .2% DMI | 171 | | | |
| 4 weeks | | 1.798 | ND* | ND* |
| 12 weeks | | 1.837 | ND* | ND* |
| .2% DMI | 172 | | | |
| 4 weeks | | 1.810 | ND* | ND* |
| 12 weeks | | 1.824 | ND* | ND* |
| .2% PD | 171 | | | |
| 4 weeks | | 1.840 | ND* | 32 |
| 12 weeks | | 1.834 | ND* | ND* |
| .2% AP (supplied by Lancaster Synthesis) | 172 | | | |
| 4 weeks | | 1.810 | ND* | ND* |
| 12 weeks | | 1.750 | ND* | ND* |
| .2% AP (supplied by TCI) | 172 | | | |
| 4 weeks | | 1.760 | 267 | ND* |
| 12 weeks | | 1.790 | ND* | ND* |

*None detected

A study of the open circuit voltages for the cells in Table 4 reveals the following: at 16 weeks ambient, the cells with DMI in the electrolyte have a 30 mV lower open circuit voltage than the cells without DMI, confirming the observation disclosed in U.S. Pat. No. 4,489,144 that DMI aids in reducing undesirably high open circuit voltage in such cells. The cells containing AP have a 35 mV lower open circuit voltage than the cells with no DMI. On the other hand, at 23 weeks ambient there is a 37 mV difference between the DMI cells and the no added DMI cells, but only a 5 mV difference between the PD cells and the cells without DMI. In general, it can be concluded that the cells with AP added to the electrolyte behave in the same manner as do cells with added DMI in reducing open circuit voltage, while the cells with PD added to the electrolyte behave in the same manner as do cells without any DMI added to the electrolyte. The cells represented in Table 5 demonstrate that the addition of AP to the electrolyte reduces open circuit voltage.

Literature studies show that AP can be obtained by the partial reduction of DMI. However, it is unexpected that DMI would be reduced in a reaction with the cathode, in view of the presence of an even stronger reducing agent, the lithium metal anode. However, when DMI is reduced with butyl lithium (often used to mimic the reducing power of lithium metal), the reaction product is 3-methyl-5-hydroxymethyl isoxazole, a compound that is not a beta-aminoenone as defined herein. The fact that this reaction product is not seen in the studies represented in Tables 1 through 5, together with the fact that AP does react readily with lithium metal, further supports the proposition that DMI is reduced in a reaction with the cathode to lower the cathode voltage and the resulting AP is consumed by the lithium anode. Based on this information, it would not be expected that AP would react with the cathode to lower its voltage. Lowering the cathode voltage presumably involves reducing the cathode. Thus, the more reducing power the additive has the more likely it is to lower the cathode voltage. AP, on the other hand, is a reduced form of DMI in that AP has two additional hydrogen atoms. AP, being already partly reduced, has less reducing power than DMI. Consequently, one would not have expected AP to be as effective as DMI or even effective at all in lowering the cathode voltage. However, the results in Tables 1 through 5 demonstrate that AP behaves in the same manner as does DMI and does lower the cathode voltage.

The amount of the beta aminoenone below 0.1 volume percent based on the volume of the electrolyte solvent would likely not provide sufficient reducing material to quickly and effectively reduce impurities and/or unwanted active species in the cell system. An amount above 5.0 volume percent based on the volume of the electrolyte solvent may provide excessive reducing material that could cause deleterious effects on other desired aspects of the cell. Although one embodiment of the invention, if focusing solely on voltage reduction, would include the use in the cathode of a metallic reducing agent such as zinc in conjunction with the beta aminoenone additive in the electrolyte, the additive can be used without the metallic reducing agent in the cell, without departing from the scope of the within invention. The omission of such a reducing agent may in fact be preferable, since such reducing agents may produce other undesirable features within the cell.

If the within invention is practiced in conjunction with the addition of a metallic reducing agent, the metallic reducing agent can either be employed in a mixture in the forming of a cathode or it could be placed in contact with the cathode. Thus, any discrete material such as a layer, a coating, a metallic screen, a metallic strip, a porous metallic strip, or a powder and could be employed as long as it is in electronic and ionic contact with the cathode. The choice of a metallic reducing agent will depend upon the voltage of the cell's active cathode material with reference to the anode of the cell. For example, while zinc may be satisfactory for a nonaqueous lithium/$FeS_2$ system, it may not be suitable for a nonaqueous lithium/$Ag_2O$ system since, in the latter, a less anodic (negative) metallic reducing agent may be required, such as tin or lead. Thus, once the EMF series is determined for a specific nonaqueous electrolyte and anode/cathode system, one can select which metallic reducing agents can be used in conjunction with the beta-aminoenone additive.

In the nonaqueous cell systems of this invention, suitable active cathode materials would include iron sulfides such as $FeS_2$ and FeS, carbon flourides such as $CF_x$, metal oxides such as $V_2O_5$, $WO_3$, $MoO_3$, lead oxides such as $Pb_3O_4$, $PbO_2$ and PbO, cobalt oxides such as $Co_3O_4$, manganese oxides such as $MnO_2$, $In_2S_3$, NiS, metal chromates such as $Ag_2CrO_4$, metal phosphates such as $Ag_3PO_4$, $LiCoO_2$, $LiMn_2O_4$, $Bi_2O_3$, CuO and $Cu_2O$ and metal sulfates such as $CuSO_4$. Highly active anodes for use in nonaqueous systems according to this invention would be consumable metals and include aluminum, the alkali metals, alkaline earth metals and alloys of alkali metals or alkaline earth metals with each other and other metals. The term "alloys" as used herein is intended to include mixtures, solid solutions, such as lithium-magnesium, and the intermetallic compounds, such as lithium monoaluminide. The preferred anode materials are lithium, sodium, potassium, calcium, magnesium and alloys thereof. Carbon anodes such as are used in lithium ion cells are also suitable anodes for use with the present invention. A preferred anode material to be used in conjunction with an $FeS_2$ cathode having an aluminum cathode substrate would be a lithium-aluminum alloy such as that disclosed in U.S. Pat. No. 5,514,491, hereby incorporated by reference in its entirety. One such alloy is 0.5% aluminum by weight and is available from Chemetall-Foote.

In nonaqueous cells, useful organic solvents employed alone or mixed in the cell of this invention include the following classes of compounds: alkylene nitriles: e.g., crotonitrile (liquid ranges, −51.1 to 120° C.); trialkyl borates: e.g., trimethyl borate, $(CH_3O)_3B$ (liquid range, −29.3° C. to 67° C.); tetraalkyl silicates: e.g., tetramethyl silicate, $(CH_3O)_4Si$ (boiling point, 121° C.); nitroalkanes: e.g., nitromethane, $CH_3NO_2$ (liquid range, −17° C. to 100.8° C.); alkylnitriles: e.g., acetonitrile, $CH_3CN$ (liquid range, −45° C. to 81.6° C.); dialkylamides: e.g., dimethylformamide, $HCON(CH_3)_2$ (liquid range, −60.48° C. to 149° C.); lactams: e.g., N-methylpyrrolidone, (liquid range, −16° C. to 202° C.); monocarboxylic acid esters: e.g., ethyl acetate (liquid range, −83.6° C. to 77.06° C.); orthoesters: e.g., trimethylorthoformate, $HC(OCH_3)_3$ (boiling point, 103° C.); lactones: e.g., (gamma)butyrolactone, (liquid range, −42° C. to 206° C.); dialkyl carbonates: e.g., dimethyl-carbonate, $OC(OCH_3)_2$ (liquid range, 2° C. to 90° C.); alkylene carbonates: e.g., propylene carbonate (liquid range, −48° C. to 242° C.), ethylene carbonate and vinylene carbonate; monoethers: e.g., diethyl ether (liquid range, −116° C. to 34.5° C.); polyethers: e.g., 1,1- and 1,2-dimethoxyethane (liquid ranges, −113.2° C. to 64.5° C. and −58° C. to 83° C., respectively); cyclic ethers: e.g., tetrahydrofuran (liquid range, −65° C. to 67° C.), 1,3-dioxolane (liquid range, −95° C. to 78° C.) and substituted dioxolanes; nitroaromatics: e.g., nitrobenzene (liquid range, 5.7° C. to 210.8° C.); cyclic sulfones: e.g., sulfolane, (melting point, 22° C.), 3-methylsulfolane (melting point, −1° C.); saturated heterocyclics: e.g., tetrahydrothiophene (liquid range, −96° C. to 121° C.); 3-methyl-2-oxazolidone (melting point, 15.9° C.); five-membered unsaturated heterocyclics: e.g. 1-meth-ylpyrrole (boiling point, 114° C.), 2,4-dimethylthiazole (boiling point, 144° C.), and furan (liquid range, −85.65° C. to 31.36° C.); dialkyl sulfoxides: e.g., dimethyl sulfoxide (liquid range, 18.4° C. to 189° C.); dialkyl sulfates: e.g., dimethylsulfate (liquid range, −31.75° C. to 188.5° C.); dialkyl sulfites: e.g., dimethylsulfite (boiling point, 126° C.); alkylene sulfites: e.g., ethylene glycol sulfite (liquid range, −11° C. to 173° C.); halogenated alkanes: e.g., methylene chloride (liquid range, −95° C. to 40° C.); 1,3-dichloropropane (liquid range, −99.5° C. to 120.4° C.). Of the above, the preferred solvents are sulfolane; tetrahydrofuran; methyl-substituted tetrahydrofuran; 1,3-dioxolane; alkyl substituted 1,3-dioxolane; 3-methyl-2-oxazolidone; propylene or ethylene carbonate; (gamma) butyrolactone; ethylene glycol sulfite; dimethylsulfite; dimethyl sulfoxide; and 1,1-, 1,2-dimethoxyethane and glymes. Of the preferred solvents, the best are 3-methyl-2-oxazolidone, propylene or ethylene carbonate, 1,2-dimethoxyethane and 1,3-dioxolane because they appear more chemically inert to battery components and have wide liquid ranges, and especially because they permit highly efficient utilization of the cathode materials.

The ionizing solute for use in the invention may be a simple or double salt or mixtures thereof, e.g., $LiCF_3SO_3$ or $LiClO_4$ or LiI, which will produce an ionically conductive solution when dissolved in one or more solvents. Useful solutes include complexes of inorganic or organic Lewis acids and inorganic ionizable salts. The only requirements for utility are that the salts, whether simple or complex, be compatible with the solvent or solvents being employed and that they yield a solution which is sufficiently ionically conductive. According to the Lewis or electronic concept of acids and bases, many substances, which contain no active hydrogen can act as acids or acceptors of electron doublets. The basic concept is set forth in the chemical literature (Journal of the Franklin Institute, Vol. 226, July/December 1938, pages 293–313 by G. N. Lewis). A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone. Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide. Ionizable salts useful in combination with the Lewis acids include lithium fluoride, lithium chloride, lithium bromide, lithium sulfide, sodium fluoride, sodium chloride, lithium bromide, potassium fluoride, potassium chloride and potassium bromide.

The within invention can be utilized in the manufacture of both primary and secondary nonaqueous cells in a wide variety of cell constructions, including but not limited to cylindrical wound cells, cylindrical bobbin cells, miniature button cells, cells with one or more planar electrodes arranged in a co-facial orientation or in a co-planar orientation and prismatic cells. Further, although the experiments were performed by adding AP to the electrolyte, one of skill in the art will appreciate that the same result can be expected by the addition of AP to the cathode of the cell, without departing from the scope of the within invention.

I claim:

1. A method for manufacturing a nonaqueous cell comprising the steps of providing an anode, an organic electrolyte solution comprising a solute dissolved in an organic solvent, and a solid cathode, and adding a beta-aminoenone to the cell.

2. The method of claim 1, wherein said beta-amminoenone is added to the electrolyte.

3. The method of claim 2 wherein the beta-aminoenone is added in a range of from 0.1 to 5.0 volume percent to the electrolyte based on the volume of the organic solvent.

4. The method of claim 3 wherein the beta-aminoenone is added in a range of from 0.2 to 4.0 volume percent to the electrolyte based on the volume of the organic solvent.

5. The method of claim 2 wherein the beta-aminoenone is 4-amino-3-penten-2-one.

6. The method of claim 2 wherein the cathode comprises a material selected from the group consisting of iron sulfides, carbon flourides, $V_2O_5$, $WO_3$, $MoO_3$, $Pb_3O_4$, $PbO_2$, PbO, $Co_3O_4$, manganese oxides, $In_2S_3$, NiS, $Ag_2CrO_4$, $Ag_3PO_4$, $LiCoO_2$, $LiMn_2O_4$, $Bi_2O_3$, CuO, $Cu_2O$ and $CuSO_4$.

7. The method of claim 6 wherein the anode comprises a material selected from the group consisting of lithium, sodium, potassium, calcium, magnesium, carbon, alloys of lithium, alloys of sodium, alloys of potassium, alloys of calcium, alloys of magnesium and alloys of carbon.

8. The method of claim 7 wherein the cathode comprises $FeS_2$ and the anode comprises a lithium and aluminum alloy.

9. The method claim 8, further comprising the step of adding a polyether to the electrolyte.

10. The method of claim 9, wherein said polyether is 1,2-dimethoxyethane.

11. The method of claim 8, further comprising the step of adding a cyclic ether to the electrolyte.

12. The method of claim 11, wherein said cyclic ether is 1,3-dioxolane.

13. The method of claim 2 wherein the anode comprises a material selected from the group consisting of lithium, sodium, potassium, calcium, magnesium, carbon, alloys of lithium, alloys of sodium, alloys of potassium, alloys of calcium, alloys of magnesium and alloys of carbon.

* * * * *